Jan. 28, 1936.     R. L. O'CONNOR     2,028,799
PISTON
Filed Jan. 29, 1934
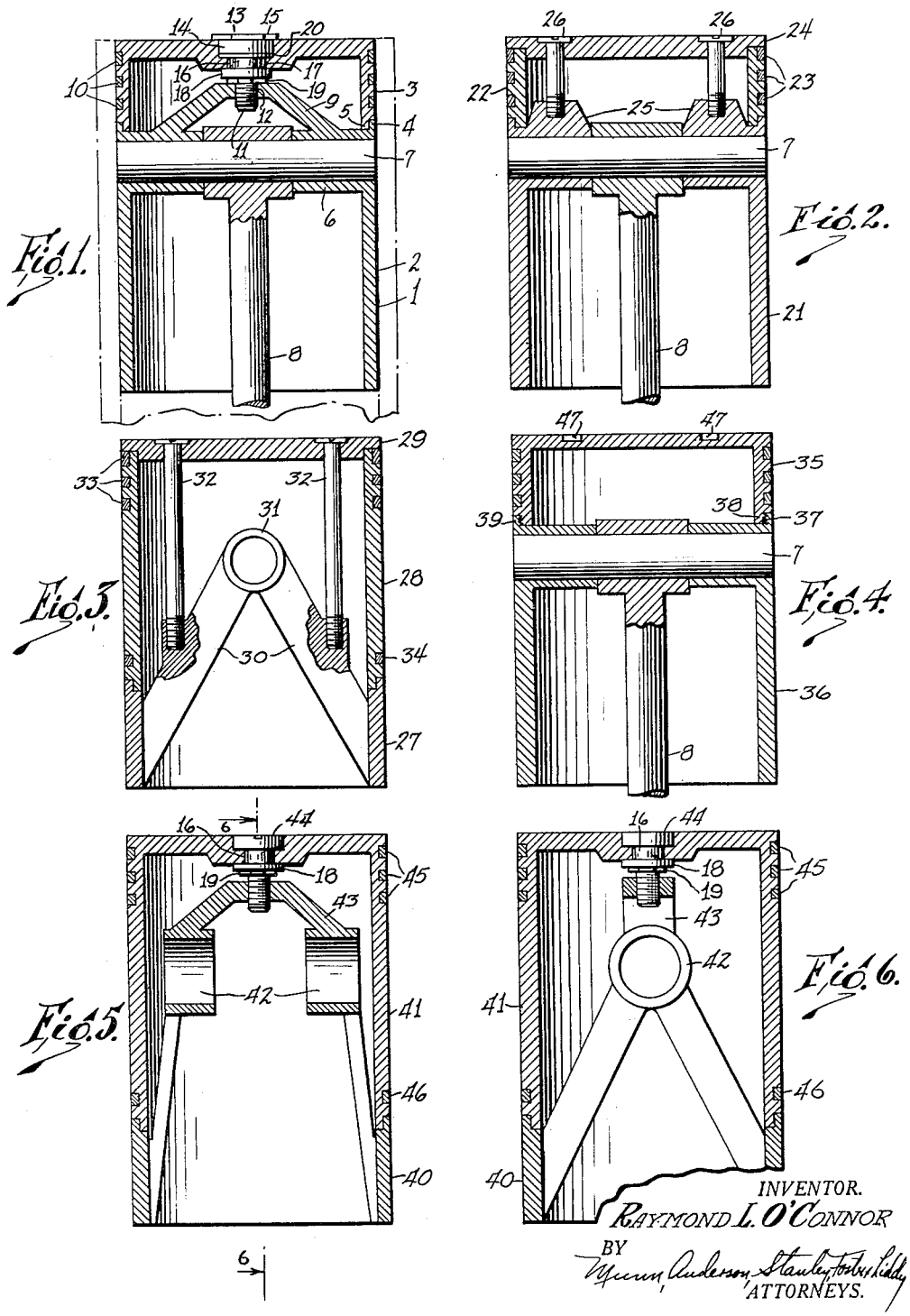
INVENTOR.
RAYMOND L. O'CONNOR
BY
ATTORNEYS.

Patented Jan. 28, 1936

2,028,799

UNITED STATES PATENT OFFICE 2,028,799

PISTON

Raymond L. O'Connor, Oakland, Calif.

Application January 29, 1934, Serial No. 708,865

1 Claim. (Cl. 309—15)

The present invention relates to improvements in pistons adapted for use in connection with all kinds of engines and pumps, and more particularly intended to be used in connection with internal combustion engines, Diesel and marine engines, et cetera.

The principal object of the present invention is to provide a piston made in two or more sections in such a manner that the particular section of the piston carrying the piston rings may be removed through the pressure chamber of the engine or pump after the head has been separated so that for the replacement of the piston rings it will not be necessary to remove the entire piston through the opposite end of the cylinder.

At the present time the operation of replacing piston rings is very complicated since it is necessary to remove the entire piston through the crank case end of the cylinder so as to make the piston rings accessible.

In accordance with my invention it is proposed to divide the piston into two or more separable sections so that the upper section carrying the piston rings may be removed from the lower section having the wrist pin attachment without the necessity of removing the entire piston.

It is further proposed in connection with the present invention to provide a piston construction in which the wrist pin bearing forms a part of the lower section of the piston, while the upper section of the piston is arranged to surround the wrist pin bearing so that the wrist pin itself is not exposed on the outside of the assembled piston and can develop no tendency to scrape the cylinder wall.

Further advantages and objects of my invention will appear as the specification proceeds.

The preferred forms of my invention are illustrated in the accompanying drawing, in which Figure 1 shows a vertical section through one form of my piston;

Figure 2 a vertical section through another form of piston made in accordance with my invention;

Figure 3 a vertical section through a further modified form of piston;

Figure 4 a vertical section through a further modification;

Figure 5 a vertical section through a still further modification of my invention; and Figure 6 a transverse vertical section taken along line 6—6 of Figure 5.

While I have shown only the preferred forms of my invention I wish to have it understood that various changes or modifications may be made within the scope of the claims hereto attached without departing from the spirit of the invention.

In the form shown in Figure 1 the piston 1 is made in two sections 2 and 3, the former referred to as the skirt section and the latter as the head section. Both of the sections are of the conventional cylindrical form and of the same outer diameter, and the upper or head section 3 fits upon the lower or skirt section by means of interlocking flanges 4 and 5. The skirt section 2 is provided with a suitable wrist pin bearing 6 adapted to receive the wrist pin 7 to which the connecting rod 8 is attached in the conventional manner. A bridge or embossment 9 surmounts the wrist pin bearing.

The head section 3 is provided with the conventional piston rings 10 and is secured to the skirt section by means of the screw 11 which latter threads into the embossment as shown at 12. The screw itself comprises a head 13 including a cylindrical portion 14 adapted to be received in a countersink in the piston head and an angular portion 15 adapted to rest on top of the cylinder head. The screw is held in the piston head with freedom of turning movement but against axial movement, and for this purpose has an enlarged upper shank portion 16 extending through a hole 17 in the piston head and being equal in length to the thickness of the piston head underneath the countersink and the screw is clamped upon the piston head by means of a washer 18 lying against the under face of the piston head and a nut 19 screwed up against the washer. A spring washer 20 may be interposed between the head 13 of the nut and the bottom of the countersink.

The piston head may be readily attached to and detached from the skirt by a turning movement of the screw without removing the skirt section from the cylinder. For attaching the piston head it is merely necessary to first insert the screw in the piston head in the manner shown in Figure 1, applying the washer 18 and the nut 19 from underneath, whereupon the piston head is inserted into the cylinder of the engine as the case may be. When the lower end of the screw reaches the embossment 9, the screw may be turned clockwise for engagement of the screw with the embossment, and after the screw has been tightened the piston head will be in proper position relative to the skirt as shown in Figure 1. For removing the piston head the screw is turned in the opposite direction, and in view of the fact that the piston head is held against endwise motion relative to the screw, the unscrewing action itself will raise the piston head away from the skirt of the piston.

A somewhat modified form of piston using the same principle is shown in Figure 2, in which the piston is made of three sections, a skirt section 21, a ring section 22 bearing the piston rings 23 and a head plate 24, which latter is secured to the embossments 25 rising from the wrist pin bearing by means of screws 26. It should be understood that the piston may be made of more than two sections without departing from the spirit of the invention which contemplates a construction in which that portion of the piston carrying the piston rings may be readily removed from the cylinder without necessitating the removal of the entire position.

The form shown in Figure 3 also contains three sections, a skirt section 27, an intermediate ring section 28, and a head plate 29, which latter is secured to webs 30 supporting the wrist pin bearing 31 by means of screws 32. This form distinguishes from the forms previously described insofar as the wrist pin bearing of the lower section 27 is disposed above the lower section and is encircled or surrounded by the ring 28, so that the wrist pin itself is entirely surrounded by the ring 28, and does not make contact with the cylinder wall as will appear to better advantage in a further modified form shown in Figure 5. In the form shown in Figure 3 the ring section 28 carries a plurality of piston rings 33 near the top, while a special piston ring 34 is provided near the bottom, a construction which has been adopted in one popular make of motor vehicle.

In the form shown in Figure 4 the head section 35 is directly threaded into the skirt section 36 by means of the thread 37 between two coacting flanges 38 and 39 on the two piston sections respectively.

The form shown in Figures 5 and 6 again slightly departs from the forms shown thus far insofar as it is made in two sections, a skirt section 40, and a head section 41 the wrist pin bearing 42 being attached to the skirt section and rising thereabove, while the head section is made sufficiently long to encircle and surround the wrist pin bearing in the manner described in connection with Figure 3. In this case the wrist pin bearing is surmounted by a bridging member or embossment 43, which latter is secured to the head by means of a screw 44 corresponding substantially to that described in connection with Figure 1. In this form three piston rings 45 are provided near the top of the piston head and a single piston ring 46 near the bottom of the piston head.

The advantages of the different constructions set forth in the above description are readily apparent. When the piston rings wear out the piston head may be easily removed from the skirt section by merely unscrewing the screw 11 in the forms shown in Figures 1, 5 and 6, or the screws 26 and 32 in the forms shown in Figures 2 and 3, or by turning the piston head by means of a suitable spanner tool engaging the two recesses 47 in the form shown in Figure 4. The piston rings may now be removed and new piston rings inserted, whereupon the head section of the piston may be returned to its place in the cylinder and may be secured to the skirt section in the manner set forth.

I claim:

A piston comprising a cylindrical skirt section having a central embossment with an axially threaded bore, a cylindrical head section fitting upon the skirt section peripherally and carrying piston rings, and a screw supported axially in the head section and being held against axial movement with respect to the head section, said screw being removably received in the bore for holding the two sections together, said screw when being removed from the bore, lifting the head section from the skirt section.

RAYMOND L. O'CONNOR.